United States Patent [19]

Marczinke et al.

[11] Patent Number: 5,461,113
[45] Date of Patent: Oct. 24, 1995

[54] PROPYLENE GRAFT COPOLYMERS

[75] Inventors: Bernd L. Marczinke, Speyer; Patrik Mueller, Kaiserslautern; Juergen Kerth, Carlsberg, all of Germany

[73] Assignee: BASF Aktiengesellschaft, Ludwigshafen, Germany

[21] Appl. No.: 208,820

[22] Filed: Mar. 11, 1994

[30] Foreign Application Priority Data

Mar. 18, 1993 [DE] Germany .................. 43 08 591.1

[51] Int. Cl.$^6$ ............................. C08F 255/02
[52] U.S. Cl. .................... 525/193; 525/240; 525/285; 525/301
[58] Field of Search ................... 525/285, 301, 525/193, 240

[56] References Cited

U.S. PATENT DOCUMENTS

| | | |
|---|---|---|
| 4,001,172 | 1/1977 | Steinkamp et al. . |
| 4,161,452 | 7/1979 | Stambaugh et al. . |
| 4,382,128 | 5/1983 | Li . |
| 5,194,509 | 3/1993 | Hasenbein et al. ............ 525/285 |

FOREIGN PATENT DOCUMENTS

| | | | |
|---|---|---|---|
| 0269000 | 6/1988 | European Pat. Off. ......... 525/285 |
| 0467178 | 1/1992 | European Pat. Off. ......... 525/285 |
| 2401149 | 7/1974 | Germany ..................... 525/285 |
| 4022570 | 1/1992 | Germany . |

OTHER PUBLICATIONS

OZ 0050/41759, Grafted, Crosslinked and Crosslinkable Propylene Copolymers.

Primary Examiner—Vasu S. Jagannathan
Attorney, Agent, or Firm—Keil & Weinkauf

[57] ABSTRACT

Propylene copolymers grafted with $\alpha,\beta$-ethylenically unsaturated carboxylic acid or carboxylic acid derivatives and consisting of a random propylene copolymer (I) with from 0.1 to 15% by weight of polymerized $C_2$–$C_{10}$-alk-1-enes and a random propylene copolymer (II) with from 15 to 80% by weight of polymerized $C_2$–$C_{10}$-alk-1-enes, are obtainable by reacting the graft monomer with the propylene copolymer at from 1 to 300 bar, from 0.01 to 1.0% by weight, based on the propylene copolymer, of the graft monomer being mixed with the molten propylene copolymer in the absence of a free radical initiator, and the grafting reaction being carried out at from 200° to 350° C.

4 Claims, No Drawings

PROPYLENE GRAFT COPOLYMERS

The present invention relates to propylene copolymers grafted with α,β-ethylenically unsaturated carboxylic acids or carboxylic acid derivatives and consisting of a random propylene copolymer (I) with from 0.1 to 15% by weight of polymerized $C_2$–$C_{10}$-alk-1-enes and a random propylene copolymer (II) with from 15 to 80% by weight of polymerized $C_2$–$C_{10}$-alk-1-enes, obtainable by reacting the graft monomer with the propylene copolymer at from 1 to 300 bar, from 0.01 to 1.0% by weight, based on the propylene copolymer, of the graft monomer being mixed with the molten propylene copolymer in the absence of a free radical initiator, and the grafting reaction being carried out at from 200° to 350° C.

The present invention furthermore relates to a process for the preparation of these propylene graft copolymers and to a process for the preparation of cross-linked or crosslinkable propylene copolymers, and to the use of the propylene graft copolymers as adhesion promoters, films, fibers or moldings.

Graft copolymers can be prepared by first reacting the polymer to be grafted with peroxides and then bringing it into contact with suitable monomers (U.S. Pat. Nos. 3,862,265, 3,953,655 and 4,001,172). As a result of the treatment with the peroxides, which act as initiators, free radicals are first formed at the polymer chain, with which monomers can undergo an addition reaction in the subsequent grafting reaction.

Processes in which homo- or copolymers of ethylene are first grafted with unsaturated carboxylic acids and/or their esters and anhydrides by a reaction initiated by organic peroxides and then reacted with polyfunctional amines or alcohols are also known (DE-A 2 627 785, EP-A 50 994, U.S. Pat. Nos. 4 089 794, 4,137,185, 4,161,452, 4,382,128). This results, as a rule, in crosslinked products which are very stable but, owing to their low melt flow, cannot be thermally processed by the methods conventionally used in plastics technology.

Processes for the preparation of grafted or crosslinked polypropylenes have also been described, but some of them have considerable deficiencies. For example, the use of peroxides in grafting or crosslinking reactions generally leads to a decrease in the molecular weight, which has a substantial adverse effect on the mechanical properties of the product obtainable (J. Appl. Poly. Sci. 32 (1986), 5431–5437). In another possible method for crosslinking polypropylenes, the latter are first grafted with vinylsilanes and then crosslinked by condensation with steam using an organotin catalyst (DE-A 3 520 106 and U.S. Pat. No. 3,328,329). However, this process is very expensive since the mostly toxic tin catalysts can be removed from the product only with difficulty. Moreover, all silane groups required for adhesion of the polymer melt to polar substrates are hydrolyzed by water on cooling, so that it is virtually no longer possible to produce multilayer laminates. Furthermore, FR 2 572 417 discloses a process in which polypropylene can be grafted by reaction with organic peroxides and unsaturated carboxylic anhydrides.

However, the use of peroxides in graft reactions frequently involves a number of disadvantages. If, for example, the monomer to be grafted is used in relatively low concentrations, relatively high peroxide concentrations are required to achieve a virtually complete conversion. However, the use of high peroxide concentrations in the grafting of polypropylenes generally leads to a sharp decrease in molecular weight and to a reduction in the adhesive strength with respect to polar substances, for example metals or polyamides, so that the polymer formed does not have satisfactory performance characteristics.

DE-A 4 022 570 discloses that propylene graft copolymers can be prepared in the absence of free radical initiators. In this process, which is easy to carry out, the graft copolymers obtained have good mechanical properties and can, if necessary, be further reacted with crosslinking agents to give crosslinked or crosslinkable materials.

However, the disadvantage of the process described in DE-A 40 22 570 is that the propylene copolymers obtained therefrom often do not exhibit very high grafting yields, which is important for certain applications. The grafting yield is understood as the percentage of the grafted monomers, based on the total amount of the graft monomers used. Because the grafting yields are not very high, the adhesive strength with respect to materials such as glass, polyamide or metals is unsatisfactory for certain applications.

It is an object of the present invention to remedy the disadvantages described and to provide, without the use of peroxides, propylene graft copolymers which exhibit a higher grafting yield and improved adhesive strength.

We have found that this object is achieved by the propylene copolymers defined at the outset which are grafted with ethylenically unsaturated carboxylic acids or carboxylic acid derivatives.

In the process leading to the novel propylene copolymers, the graft monomers used are α,β-unsaturated carboxylic acids or carboxylic acid derivatives. α,β-Unsaturated carboxylic acids or carboxylic acid derivatives are to be understood as meaning the conventional carboxylic acids copolymerizable with propylene, and their ester, anhydride or amide derivatives. Among those preferably used are maleic acid, fumaric acid, itaconic acid, acrylic acid, crotonic acid and their anhydrides, maleic anhydride being particularly suitable.

In the process leading to the novel propylene copolymers, the graft monomers are reacted with a propylene copolymer which consists of a random propylene copolymer (I) with from 0.1 to 15% by weight of polymerized $C_2$–$C_{10}$-alk-1-enes and a random propylene copolymer (II) with from 15 to 80% by weight of polymerized $C_2$–$C_{10}$-alk-1-enes. A preferably used propylene copolymer is one which comprises a random propylene copolymer (I) with from 0.2 to 12, in particular from 0.3 to 9, % by weight of polymerized $C_2$–$C_{10}$-alk-1-enes and a random propylene copolymer (II) with from 20 to 75, in particular from 25 to 70, % by weight of polymerized $C_2$–$C_{10}$-alk-1-enes. The $C_2$–$C_{10}$-alk-1-enes used are in particular ethylene, but-1-ene, pent-1-ene, hex-1-ene, hept-1-ene or oct-1-ene, and the $C_2$–$C_{10}$-alk-1-enes may be copolymerized both individually and as a mixture together with the propylene in the preparation of these copolymers.

A propylene copolymer which consists of from 25 to 97% by weight of the random propylene copolymer (I) and of from 3 to 75% by weight of the random propylene copolymer (II) is preferably used. Particularly preferred propylene copolymers contain from 35 to 95, in particular from 40 to 93, % by weight of random propylene copolymers (I) and from 5 to 65, in particular from 7 to 60, % by weight of random propylene copolymer (II).

This propylene copolymer is usually prepared by polymerization with the aid of Ziegler-Natta catalysts. These contain, inter alia, a cocatalyst in addition to a titanium-containing solid component. A suitable cocatalyst is an aluminum compound. An electron donor compound is preferably used as a further component of the cocatalyst, in addition to this aluminum compound. The polymerization is carried out, preferably in the gas phase, in the reactors usually used in industry for polymerization reactions.

For the preparation of the titanium-containing solid component, halides or alcoholates of trivalent or tetravalent titanium are generally used as titanium compounds, the chlorides of titanium, in particular titanium tetrachloride, being preferred. Advantageously, the titanium-containing solid component contains a finely divided carrier, silicas and aluminas as well as aluminum silicates of the empirical formula $SiO_2 \cdot aAl_2O_3$, where a is from 0.001 to 2, in particular from 0.01 to 0.5, having proven useful for this purpose.

Compounds of magnesium are among the further compounds used in the preparation of the titanium-containing solid component. Suitable compounds of this type are in particular magnesium halides, magnesium alkyls and magnesium aryls, as well as alkoxymagnesium and aryloxymagnesium compounds, magnesium dichloride, magnesium dibromide and di-$C_1$–$C_{10}$-alkylmagnesium compounds being preferably used. In addition, the titanium-containing solid component may contain halogen, preferably chlorine or bromine.

The titanium-containing solid component furthermore contains electron donor compounds, for example mono- or polyfunctional carboxylic acids, carboxylic anhydrides and carboxylic esters as well as ketones, ethers, alcohols, lactones and organophosphorus and organosilicon compounds. Preferably used electron donor compounds within the titanium-containing solid component are phthalic acid derivatives of the general formula I

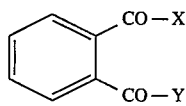
I where X and Y are each chlorine or $C_1$–$C_{10}$-alkoxy or together are oxygen. Particularly preferred electron donor compounds are phthalates, in which X and Y are each $C_1$–$C_8$-alkoxy, for example methoxy, ethoxy, propoxy or butoxy.

Further preferred electron donor compounds within the titanium-containing solid component include diesters of 3-membered or 4-membered, unsubstituted or substituted cycloalkyl-1,2-dicarboxylic acids and monoesters of unsubstituted or substituted benzophenone-2-carboxylic acids. The hydroxy compound used in the case of these esters are the alcohols conventionally used in esterification reactions, including $C_1$–$C_{15}$-alkanols, $C_5$–$C_7$-cycloalkanols, which in turn may carry $C_1$–$C_{10}$-alkyl groups, and $C_6$–$C_{10}$-phenols.

The titanium-containing solid component can be prepared by conventional methods. Examples of these are described in, inter alia, EP-A 45 975, EP-A 45 977, EP-A 86 473, EP-A 171 200, GB-A 2 111 066 and U.S. Pat. No. 4,857,613.

The titanium-containing solid component thus obtainable is used with cocatalysts as the Ziegler-Natta catalyst system. Suitable cocatalysts are aluminum compounds and further electron donor compounds.

Aluminum compounds which are suitable as the cocatalyst are trialkylaluminum as well as compounds in which an alkyl group is replaced by an alkoxy group or by a halogen atom, for example by chlorine or bromine. Trialkylaluminum compounds whose alkyl groups are each of 1 to 8 carbon atoms, for example trimethyl-, triethyl- or methyldiethylaluminum, are preferably used.

In addition to the aluminum compound, electron donor compounds, for example mono- or polyfunctional carboxylic acids, carboxylic anhydrides and carboxylic esters, and ketones, ethers, alcohols, lactones and organophosphorus and organosilicon compounds are also preferably used as further cocatalysts. Preferred electron donor compounds are organosilicon compounds of the general formula II $$R^1{}_n Si(OR^2)_{4-n} \qquad \text{II}$$

where the radicals $R^1$ are identical or different and are each $C_1$–$C_{20}$-alkyl, a 5-membered to 7-membered cycloalkyl group which in turn may carry a $C_1$–$C_{10}$-alkyl group, or $C_6$–$C_{20}$-aryl or aralkyl, the radicals $R^2$ are identical or different and are each $C_1$–$C_{20}$-alkyl and n is 1, 2 or 3. Particularly preferred compounds are those in which $R^1$ is $C_1$–$C_8$-alkyl or a 5-membered to 7-membered cycloalkyl group, $R^2$ is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane, diethoxyisobutylisopropylsilane and dimethoxyisopropyl-sec-butylsilane are particularly noteworthy.

Preferably used catalyst systems are those in which the atomic ratio of aluminum from the aluminum compound to titanium from the titanium-containing solid component is from 10:1 to 800:1, in particular from 20:1 to 200:1, and the molar ratio of the aluminum compound to the electron donor compound used as the cocatalyst is from 1:1 to 100:1, in particular from 2:1 to 80:1. The individual catalyst components may be introduced into the polymerization system individually in any order or as a mixture of two components.

With the aid of such catalyst systems, it is possible to prepare the propylene copolymers required for the preparation of the novel graft polymers. These are preferably obtainable, inter alia, by first preparing the random propylene copolymer (I) in a first polymerization stage and then adding the random propylene copolymer (II) to this. This can be effected, for example, in a two-stage reactor cascade. The order of the preparation of the individual propylene copolymers (I) and (II) can also be reversed.

The polymerization in the first polymerization stage is preferably carried out at from 20 to 40, in particular from 25 to 35, bar and from 60° to 90° C., in particular from 65° to 85° C., during an average residence time of the reaction mixture of from 0.5 to 5, in particular from 1.0 to 4, hours. Usually, the reaction conditions are chosen so that, in the first polymerization stage, from 0.05 to 2, preferably from 0.1 to 1.5, kg of the propylene copolymer (I) is formed per mmol per aluminum component. It is advisable to establish the ratio of the partial pressure of propylene to that of $C_2$–$C_{10}$-alk-1-ene at from about 5:1 to 500:1, in particular from 10:1 to 200:1. The polymerization can be carried out in the presence of regulators, for example of hydrogen.

The propylene copolymer (I) obtainable in this manner is discharged together with the catalyst from the first polymerization stage after the end of the reaction and is introduced into the second polymerization stage, where the propylene copolymer (II) is formed by polymerizing a mixture of propylene and further $C_2$–$C_{10}$-alk-1-enes onto said copolymer (I).

In the second polymerization stage, the polymerization is preferably carried out at from 5 to 30, in particular from 10 to 25, bar and from 30° to 80° C., in particular from 40° to 70° C. and during an average residence time of from 0.5 to 5, in particular from 1.0 to 4, hours. The ratio of the partial pressure of propylene to that of $C_2$–$C_{10}$-alk-1-ene in this case is from about 0.1:1 to 20:1, in particular from 0.15:1 to 15:1. The weight ratio of the monomers reacted in the first polymerization stage to those reacted in the second polymerization stage is from about 33:1 to 1:3, in particular from 19:1 to 1:2.

It is also advisable to add a $C_1$–$C_8$-alkanol, in particular a $C_1$–$C_4$-alkanol, to the reaction mixture of the second polymerization stage, said alkanol influencing the activity of the Ziegler-Natta catalyst. Alcohols which are suitable for this purpose include methanol, ethanol, n-propanol, n-butanol and very particularly isopropanol. The amount of the $C_1$–$C_8$-alkanol is advantageously such that the molar ratio of the $C_1$–$C_8$-alkanol to the aluminum compound serving as cocatalyst is from 0.01:1 to 10:1, in particular from 0.02:1 to 5:1.

The molecular weight of the propylene copolymers (II) obtainable can be controlled in the usual manner by the addition of regulators, in particular of hydrogen. It is also possible for inert gases, such as nitrogen or argon, to be present.

The propylene copolymer to be used according to the invention, consisting of the random propylene copolymer (I) and the random propylene copolymer (II), is obtained in this manner.

The novel propylene graft copolymers are prepared by a process in which from 0.01 to 1.0% by weight, based on the propylene copolymer, of the graft monomer is mixed with the molten propylene copolymer at from 1 to 300, preferably from 1 to 250, bar in the absence of a free radical initiator, and the grafting reaction is carried out at from 200° to 350° C. The graft monomer is preferably used in concentrations of from 0.01 to 0.8, in particular from 0.01 to 0.5, % by weight, based in each case on the propylene copolymer. The grafting reaction can be advantageously carried out at from 210° to 290° C., in particular from 210° to 280° C., and during residence times of from 0.5 to 10, in particular from 0.5 to 5, minutes.

In the case of the peroxide-free grafting of the propylene copolymers, the reactors conventionally used in plastics technology, for example extruders or Brabender mixers, may be employed. Twin-screw extruders are particularly suitable. In a preferred embodiment, the propylene copolymer is metered together with the graft monomer, in the absence of an organic peroxide, into the feed of the twin-screw extruder, where the mixture is first melted at from about 120° to 180° C. and then grafted at from 200° to 350° C. for from 0.5 to 5 minutes. The graft monomer is preferably added in the liquid state and is heated beforehand. The graft monomer may also be introduced into the extruder after melting of the propylene copolymer. Advantageously, traces of unconverted graft monomer are removed in two devolatilization zones downstream of the feed zone of the extruder, after the end of the grafting reaction.

The propylene graft copolymers obtainable in this manner usually contain from 0.01 to 1% by weight of the graft monomers. They have good performance characteristics, in particular high adhesive strength with respect to polar substances, for example metals or polyamides. Moreover, they exhibit an improved grafting yield. Their flow has scarcely changed in comparison with the ungrafted propylene copolymer since there is virtually no decrease in the molecular weight in the grafting reaction, owing to the peroxide-free procedure. They are colorless and odorless and have only low residual monomer contents. Their melt flow indices are from 0.1 to 100, preferably from 10 to 50, g/10 min, measured in each case according to DIN 53,735 at 230° C. and 2.16 kg. The melt flow index corresponds to the amount of polymer which is forced, in the course of 10 minutes, at 230° C. and under a weight of 2.16 kg, out of the test apparatus standardized according to DIN 53,735.

The novel propylene graft copolymers are suitable, inter alia, as adhesion promoters, films, fibers or moldings. They can also be reacted with organic crosslinking agents, for example diamines, to give crosslinked or crosslinkable propylene copolymers.

EXAMPLES

Examples 1 and 2 and Comparative Examples A and B were carried out in a ZSK 40 twin-screw extruder from Werner & Pfleiderer. The propylene copolymers used were added to the twin-screw extruder in the form of grit or granules and were melted there at 180° C. The polymer throughput through the extruder was 20 kg/h and the average residence time was 2 minutes.

EXAMPLE 1

100 parts by weight of a propylene/ethylene copolymer consisting of 55.2% by weight of a random ethylene/propylene copolymer [determined by extraction fractionation according to W. Holtrup, Makromol. Chem. 178 (1977), 2335] with 2.5% by weight of polymerized ethylene [determined by Fourier transform spectroscopy] and 44.8% by weight of a propylene/ethylene copolymer containing 50% by weight of ethylene, having a melt flow index of 1.0 g/10 min [at 230° C. and 2.16 kg, according to DIN 53,735], were melted in a ZSK 40 twin-screw extruder at 180° C., 0 25 part by weight of liquid maleic anhydride was added and the reaction was carried out at 260° C. The pressure was 10 bar. After the end of the reaction, unconverted maleic anhydride was removed from the polymer melt by devolatilization and the product was then cooled in a water bath, granulated and dried. The content of grafted maleic anhydride, the grafting yield (content of grafted maleic anhydride, based on the total amount of maleic anhydride used), the melt flow index and the adhesion to polyamide in the Examples and the Comparative Examples are shown in the Table below.

COMPARATIVE EXAMPLE A 100 parts by weight of a propylene/ethylene copolymer consisting of 50.8% by weight of a propylene homopolymer [determined by extraction fractionation according to W. Holtrup, Makromol. Chem. 178 (1977), 2335] and 49.2% by weight of a propylene/ethylene copolymer containing 60% by weight of ethylene [determined by Fourier transform spectroscopy], having a melt flow index of 1.2 g/10 min, are grafted with 0.25 part by weight of maleic anhydride under the conditions of Example 1.

EXAMPLE 2

100 parts by weight of a propylene/ethylene copolymer consisting of 55.5% by weight of a random ethylene/propylene copolymer [determined by extraction fractionation according to W. Holtrup, Makromol. Chem. 178 (1977), 2335] with 2.5% by weight of polymerized ethylene [determined by Fourier transform spectroscopy] and 44.5% by weight of a propylene/ethylene copolymer containing 28% by weight of ethylene, having a melt flow index of 1.5 g/10 min [at 230° C. and 2.16 kg, according to DIN 53,735], were melted in a ZSK 40 twin-screw extruder at 180° C., 0.25 part by weight of liquid maleic anhydride was added and the reaction was carried out at 260° C., these tests being carried out under the conditions of Example 1.

COMPARATIVE EXAMPLE B 100 parts by weight of a propylene/ethylene copolymer consisting of 54.2% by weight of a propylene homopolymer [determined by extraction fractionation according to W. Holtrup, Makromol. Chem. 178 (1977), 2335] and 45.8% by weight of a propylene/ethylene copolymer containing 28% by weight of ethylene, having a melt flow index of 1.3 g/10 min [at 230° C. and 2.16 kg, according to DIN 53,735], are grafted with 0.25 part by weight of maleic anhydride under the conditions of Example 1.

TABLE

|  | Examples | | Comparative Examples | |
| --- | --- | --- | --- | --- |
|  | 1 | 2 | A | B |
| Content of grafted maleic anhydride [parts by weight per 100 parts by weight of propylene copolymer] | 0.19 | 0.18 | 0.16 | 0.14 |
| Grafting yield [%] | 76 | 72 | 64 | 56 |
| Melt flow index* [230° C./2.1 kg] | 4.5 | 4.4 | 4.9 | 4.8 |
| Adhesion to polyamide** [N/15 mm] | 18 | 17 | 14 | 13 |

*According to DIN 53,735
**According to EP-A 157 107, pages 4–5

The Table shows that the novel propylene graft copolymers exhibit in particular a higher grafting yield and improved adhesive strength.

We claim:

1. A propylene copolymer grafted with α,β-ethylenically unsaturated carboxylic acids or carboxylic acid derivatives and consisting of a random propylene copolymer (I) with from 0.1 to 15% by weight of polymerized $C_2$–$C_{10}$-1-alkenes and a random propylene copolymer (II) with from 15 to 80% by weight of polymerized $C_2$–$C_{10}$-1-alkenes, obtained by reacting the graft monomer with the propylene copolymer at from 1 to 300 bar, from 0.01 to 1.0% by weight, based on the propylene copolymer, of the graft monomer being mixed with the molten propylene copolymer in the absence of a free radical initiator, and the grafting reaction being carried out at from 200° to 350° C.

2. A propylene graft copolymer as defined in claim 1, wherein the propylene copolymer used is one which consists of from 25 to 97% by weight of the random propylene copolymer (I) and from 3 to 75% by weight of the random propylene copolymer (II).

3. A propylene graft copolymer as defined in claim 1, wherein the propylene copolymer used is one which consists of from 35 to 95% by weight of a random propylene copolymer (I) with from 0.2 to 12% by weight of polymerized $C_2$–$C_{10}$-1-alkenes and of from 5 to 65% by weight of a random propylene copolymer (II) with from 20 to 75% by weight of polymerized $C_2$–$C_{10}$-1-alkenes.

4. A propylene graft copolymer as defined in claim 1, obtained by grafting the propylene copolymer with maleic anhydride.

* * * * *